United States Patent
Kim et al.

(10) Patent No.: US 9,882,233 B2
(45) Date of Patent: Jan. 30, 2018

(54) STEPPED BATTERY AND METHOD AND DEVICE FOR MANUFACTURING THE SAME

(71) Applicant: LG CHEM, LTD., Seoul (KR)

(72) Inventors: Young Hoon Kim, Daejeon (KR); Sung Jin Kwon, Daejeon (KR); Dong Myung Kim, Daejeon (KR); Ki Woong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 142 days.

(21) Appl. No.: 14/417,278

(22) PCT Filed: Dec. 3, 2014

(86) PCT No.: PCT/KR2014/011746
§ 371 (c)(1),
(2) Date: Jan. 26, 2015

(87) PCT Pub. No.: WO2015/102242
PCT Pub. Date: Jul. 9, 2015

(65) Prior Publication Data
US 2015/0295273 A1    Oct. 15, 2015

(30) Foreign Application Priority Data

Jan. 6, 2014 (KR) .................. 10-2014-0001295
Aug. 25, 2014 (KR) .................. 10-2014-0110759

(51) Int. Cl.
*H01M 10/04* (2006.01)
*H01M 10/0585* (2010.01)
*H01M 10/0525* (2010.01)

(52) U.S. Cl.
CPC ... *H01M 10/0459* (2013.01); *H01M 10/0404* (2013.01); *H01M 10/049* (2013.01)

(58) Field of Classification Search
CPC ............ H01M 10/04; H01M 10/0459; H01M 10/0436; H01M 10/0413; H01M 10/0585; H01M 10/0525
See application file for complete search history.

(56) References Cited

U.S. PATENT DOCUMENTS 6,689,511 B2    2/2004 Yamada et al.
2001/0005561 A1    6/2001 Yamada et al.
(Continued)

FOREIGN PATENT DOCUMENTS

EP    2 858 163 A1    4/2015
EP    2 874 244 A1    5/2015
(Continued)

OTHER PUBLICATIONS

European Office Action for Appl. No. 14851406.0 dated Nov. 21, 2016.
(Continued)

*Primary Examiner* — Karie O'Neill Apicella
(74) *Attorney, Agent, or Firm* — Birch, Stewart, Kolasch & Birch, LLP (57) ABSTRACT

Provided are a stepped battery and a method and device for manufacturing the stepped battery, and more particularly, a stepped battery and a method and device for manufacturing the stepped battery, which processes a tent part of a separation film formed on a stepped part of the stepped battery, to prevent a defect from occurring during a subsequent process. A stepped battery manufacturing method includes preparing a stepped battery (10) having a tent portion of a separation film (16) formed on at least one stepped surface (18), and pressing the tent portion by using a press tool (30) having a shape corresponding to the stepped surface (18) of the stepped battery (10).

9 Claims, 6 Drawing Sheets

(56) References Cited

U.S. PATENT DOCUMENTS

| | | |
|---|---|---|
| 2013/0295436 A1 | 11/2013 | Kwon et al. |
| 2014/0011070 A1* | 1/2014 | Kim .................... H01M 2/0212 429/152 |
| 2014/0087224 A1 | 3/2014 | Kim et al. |
| 2014/0134484 A1 | 5/2014 | Kwon et al. |
| 2014/0186685 A1* | 7/2014 | Kwon .................... H01M 2/18 429/160 |
| 2015/0288021 A1 | 10/2015 | Kwon et al. |
| 2016/0028126 A1 | 1/2016 | Kwon et al. |
| 2016/0181667 A1 | 6/2016 | Kim et al. |
| 2016/0372781 A1 | 12/2016 | Kwon et al. |

FOREIGN PATENT DOCUMENTS

| | | |
|---|---|---|
| EP | 2933865 A1 | 10/2015 |
| EP | 2940776 A1 | 11/2015 |
| JP | 2001-28275 A | 1/2001 |
| JP | 2001-167743 A | 6/2001 |
| JP | 3611765 B2 | 1/2005 |
| JP | 3680797 B2 | 8/2005 |
| JP | 2012-209124 A | 10/2012 |
| JP | 2012-221828 A | 11/2012 |
| JP | 2015-508223 A | 3/2015 |
| JP | 2015-509654 A | 3/2015 |
| JP | 2015-510678 A | 4/2015 |
| JP | 2015-514291 A | 5/2015 |
| JP | 2015-529954 A | 10/2015 |
| JP | 2015-535650 A | 12/2015 |
| JP | 2016-506027 A | 2/2016 |
| KR | 2003-0020464 A | 3/2003 |
| KR | 10-2013-0106781 A | 9/2013 |
| KR | 10-2013-0113366 A | 10/2013 |
| KR | 10-2013-0135204 A | 12/2013 |
| WO | WO 2013/141528 A1 | 9/2013 |
| WO | WO 20141104479 A1 | 7/2014 |
| WO | WO 2014/137018 A1 | 9/2014 |

OTHER PUBLICATIONS

Chinese Office Action and Search Report, dated Jul. 28, 2016, for Chinese Application No. 201480002822.1, as well as an English translation.

* cited by examiner

STEPPED BATTERY AND METHOD AND DEVICE FOR MANUFACTURING THE SAME

TECHNICAL FIELD

The present invention relates to a stepped battery and a method and device for manufacturing the stepped battery, and more particularly, to a stepped battery and a method and device for manufacturing the stepped battery, which processes a tent part of a separation film formed on a stepped part of the stepped battery, to prevent a defect from occurring during a subsequent process.

BACKGROUND ART

As recent electronic products are miniaturized and slimmed into various shapes, conventional rectangular parallelepiped batteries are inappropriate to efficiently use inner spaces of miniaturized and slimmed electronic products.

Thus, batteries having various shapes, such as stepped batteries, are manufactured to correspond to the shapes of battery accommodating spaces in electronic products.

Stepped batteries are formed by sequentially stacking cells, having various sizes and shapes, into a desired shape. A technology of forming a stepped battery in a stack and folding manner is disclosed (refer to Korean Patent Publication No. 2013-106781).

Although such technologies of manufacturing a stepped battery by stacking cells in a folding manner are significantly convenient and advantageous in a manufacturing process, a tent shape formed by a separation film after the manufacturing process is an issue that should be addressed.

Figure 1:
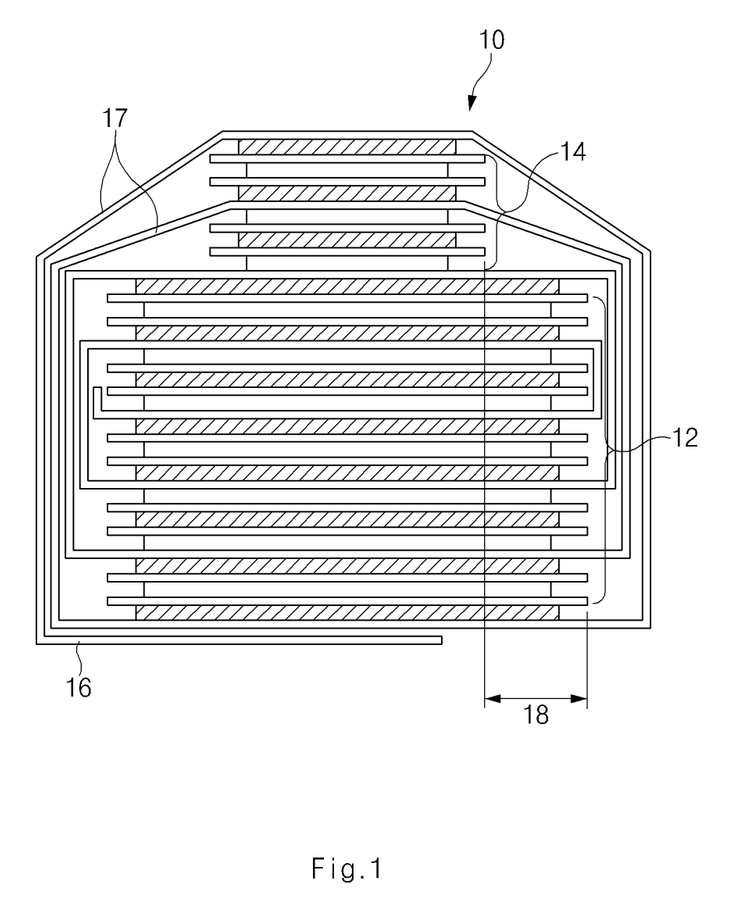
FIG. 1 is a side view illustrating a stepped battery formed in a stack and folding manner.
Figure 2:
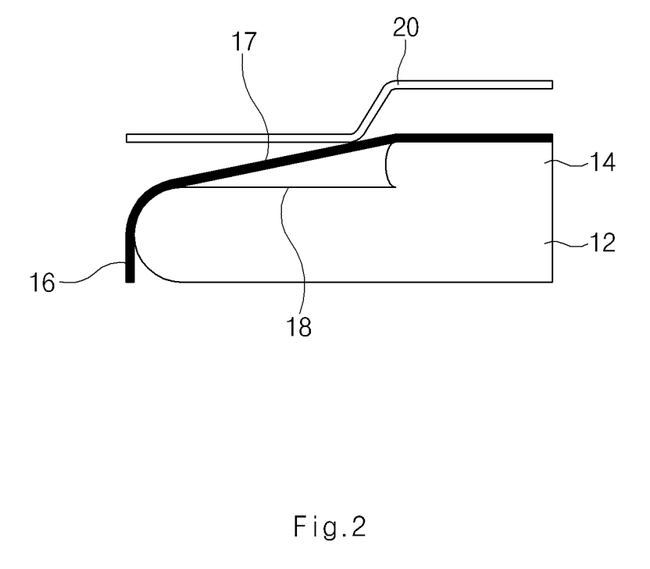
FIG. 2 is a side view illustrating a process of accommodating the stepped battery of FIG. 1 in a pouch.

FIG. 1 is a side view illustrating a stepped battery 10 formed in a stack and folding manner. FIG. 2 is a side view illustrating a process of accommodating the stepped battery of FIG. 1 in a pouch.

Referring to FIGS. 1 and 2, a first bi-cell (a radical unit), which is constituted by a cathode, a separator, an anode, a separator, and a cathode, and a second bi-cell (a radical unit) which is constituted by an anode, a separator, a cathode, a separator, and an anode are stacked and folded using a separation film 16 for a folding operation, thereby forming the stepped battery 10. When a stepped battery is manufactured in a stack and folding manner, small cells 14 are stacked on large cells 12 to form stepped surfaces 18 between the small cells 14 and the large cells 12, thereby forming tent shapes on the separation film 16, as illustrated in FIGS. 1 and 2 . . . . The stepped surfaces 18 may be surfaces that form stepped parts caused by a difference in size between the small cells 14 and the large cells 12.

When a tent portion of the separation film 16 is accommodated in a pouch 20 having a step shape needed for the stepped battery 10 as illustrated in FIG. 2, the tent portion interferes with the pouch 20 so as to break the separation film 16 or push the separation film 16, thereby moving stacked electrodes, which causes an additional defect.

DISCLOSURE OF THE INVENTION

Technical Problem

Accordingly, the present invention aims at providing a stepped battery and a method and device for manufacturing the stepped battery, in which: a tent portion of a separation film formed over a stepped surface of the stepped battery formed through a stack and folding process is processed to correspond to a stepped part of a pouch having a predetermined desired shape, thereby preventing the tent portion of the separation film from significantly interfering with a side wall of the pouch in a packaging process for an electrode assembly, so that the tent portion does not affect the electrode assembly; and the pouch supports an end of a stepped part of the stepped battery to prevent a movement of the electrode assembly accommodated in the pouch.

Technical Solution

According to an aspect of the present invention, there is provided a stepped battery manufacturing method including: preparing a stepped battery (10) having a tent portion of a separation film (16) formed on at least one stepped surface (18); and pressing the tent portion by using a press tool (30) having a shape corresponding to the stepped surface (18) of the stepped battery (10) placed on a lower jig.

According to another aspect of the present invention, there is provided a stepped battery (10) having at least one stepped surface (18) and including a separator surplus part (17) covering the stepped surface (18), wherein the separator surplus part (17) is attached to the stepped surface (18).

According to another aspect of the present invention, there is provided a stepped battery (10) having at least one stepped surface (18) and including a separator surplus part (17) covering the stepped surface (18), wherein the separator surplus part (17) is stepped into a shape corresponding to the stepped surface (18).

According to another aspect of the present invention, there is provided a device for processing a tent portion of a stepped battery (10), including: a lower jig on which the stepped battery (10) is placed; and a press tool (30) that has a shape corresponding to a stepped surface (18) of the stepped battery (10) placed on the lower jig and that moves downward to the lower jig or moves upward from the lower jig.

Advantageous Effects

According to the present invention, a tent-shaped portion of a stepped battery is attached to a stepped part and is thus removed, thereby preventing a defect that would otherwise occur during a subsequent process.

In addition, an electrode assembly of a stepped battery is formed into a shape corresponding to the shape of a pouch, thereby preventing the pouch from interfering with a tent part.

In addition, when a tent shape of a stepped battery is attached, a separation film is prevented from being damaged, thereby preventing a defect that would otherwise occur during a main process.

In addition, a tent portion of a stepped battery is pressed while or after the upper end of the stepped battery is pressed, thereby preventing an alignment defect in a small cell area which would otherwise occur while the pressing of the tent portion.

In addition, a tent-shaped portion is processed during a hot press process after a folding process for a stepped battery, thereby reducing the number of processes.

The above described effects and specified effects of the present invention are also described in the following mode for carrying out the present invention.

MODE FOR CARRYING OUT THE INVENTION

Embodiments of the present invention will be described in detail with reference to the accompanying drawings.

Figure 3:
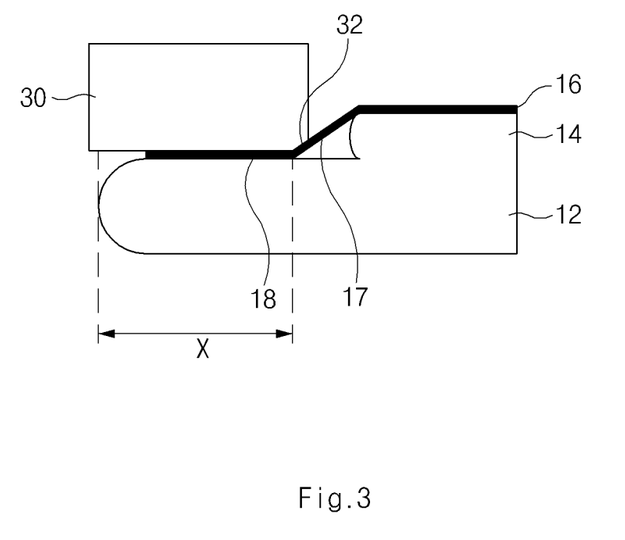
FIG. 3 is a side view illustrating an operation state of a press tool that processes a tent portion formed on a stepped part of a stepped battery, in a stepped battery manufacturing method according to an embodiment of the present invention.

FIG. 1 is a side view illustrating a stepped battery formed in a stack and folding manner. FIG. 2 is a side view illustrating a process of accommodating the stepped battery of FIG. 1 in a pouch. FIG. 3 is a side view illustrating an operation state of a press tool that processes a tent portion formed on a stepped part of a stepped battery, in a stepped battery manufacturing method according to an embodiment of the present invention.

Referring to FIGS. 1 to 3, a stepped battery manufacturing method according to an embodiment of the present invention will now be described. A stepped battery described according to the current embodiment may be formed in a stack and folding manner.

The stack and folding manner may be a method in which a first bi-cell (a radical unit) and a second bi-cell (a radical unit), which are formed by stacking electrodes and separators, are stacked and folded using a separation film 16 for a folding operation.

However, a method of manufacturing the stepped battery 10 is not limited thereto, and thus, various methods can be used. For example, the stepped battery 10 may be formed by attaching separate electrodes to the separation film 16 and folding the separation film 16. In this case, the separation film 16 may be located between the separate electrodes.

After a folding process is completed, the stepped battery 10 undergoes a process of aligning and fixing the radical units by a hot press jig and is then aligned with a predetermined location of a lower jig (not shown) and is placed therein. At this point, the stepped battery 10 has one or more stepped surfaces 18 that are covered with the separation film 16. In this case, separator surplus parts 17 may be portions of the separation film 16 which cover the stepped surfaces 18. The separator surplus parts 17 may have a tense tent shape by tension generated during the folding process.

Tent portions of the separator surplus parts 17 may be pressed against the stepped battery 10 placed and prepared in position on the lower jig. At this point, a press tool 30 may be used. The press tool 30 has a shape corresponding to the stepped surfaces 18 of the stepped battery 10 placed on the lower jig, and moves downward to the lower jig to press the tent portions of the separator surplus parts 17.

A hot press tool formed by heating the press tool 30 to a high temperature may press the tent portions of the separator surplus parts 17. At this point, the hot press tool moves downward to press a tent shape part of the separation film 16 formed on a stepped part 18 between a large cell 12 and a small cell 14. Accordingly, the separator surplus part 17 is attached onto the stepped part 18 by heat.

After that, a large portion of the tent shape part of the separation film 16 is removed (refer to FIGS. 2 and 3). After pressing the tent portions, the press tool 30 may move upward from the lower jig and return to an original location thereof.

At this point, a contact area X between the press tool 30 and the stepped surface 18 may be equal to or greater than an area of a horizontal portion of a stepped surface of a pouch 20 that packages the stepped battery 10. Accordingly, while the stepped battery 10 is accommodated in the pouch 20, the pouch 20 and a tent portion of the separation film 16 may be prevented from interfering with each other.

The press tool 30 may have a lower edge that contacts at least the separation film 16 and that may be provided with a chamfer 32. When the press tool 30 pressing the tent portion of the separation film 16 has a sharp edge, the sharp edge may damage the separation film 16 to which tensile force is applied. Thus, the chamfer 32 prevents strong pressure from being applied to a portion of the separation film 16, and a slope surface of the separation film 16 is naturally formed at a forming angle of the chamfer 32.

Figure 4:
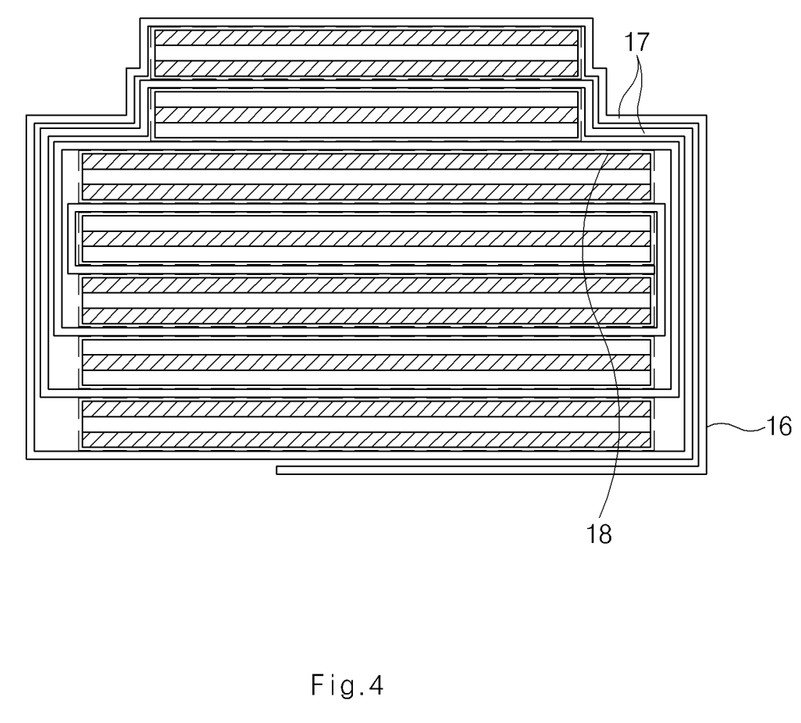
FIG. 4 is a side view illustrating the stepped battery after the press tool of FIG. 3 processes the stepped battery.
Figure 5:
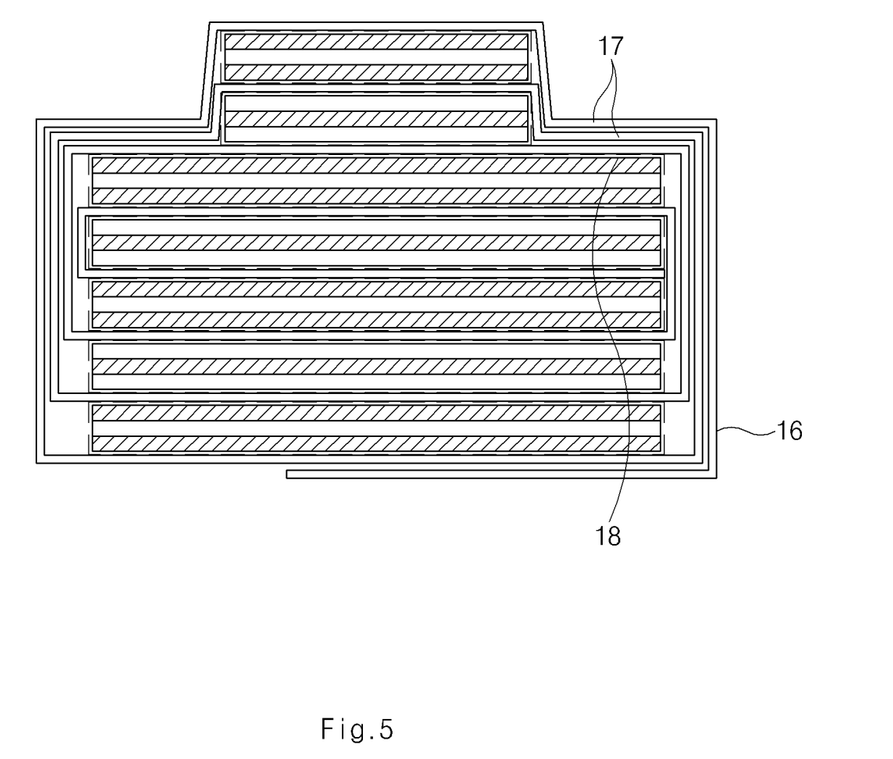
FIG. 5 is a side view illustrating the stepped battery when the press tool of FIG. 3 attaches a separator surplus part to a portion of a stepped surface.

FIG. 4 is a side view illustrating the stepped battery after the press tool of FIG. 3 processes the stepped battery. FIG. 5 is a side view illustrating the stepped battery when the press tool of FIG. 3 attaches a separator surplus part to a portion of a stepped surface.

Referring to FIG. 4, a portion of the separation film 16 on the stepped surface 18 is completely vertical and is attached to a side surface of a small cell. In this case, the separator surplus part 17 is completely attached to the whole of the stepped surface 18. However, the separator surplus part 17 may be incompletely attached to the whole of the stepped surface 18. The separator surplus part 17 may be formed at a steep angle as illustrated in FIG. 3 or 5.

Referring to FIG. 5, the separator surplus part 17 is attached to a portion of the stepped surface 18. Even in this case, a pouch and the separation film 16 may be prevented from interfering with each other. Thus, this case is also within the scope of the present invention.

As such, only a portion of the separator surplus part 17 may be attached to the stepped surface 18. Whether the separator surplus part 17 is attached to a portion of the stepped surface 18 or the whole thereof may be determined according to a condition of a press process or a shape of the pouch 20.

Furthermore, the separator surplus part 17 may not be attached to the stepped surface 18. Even in this case, when the tent portion of the separator surplus part 17 is pressed to step the separator surplus part 17 into a shape corresponding to the stepped surface 18, the above described effect can be achieved. That is, the separator surplus part 17 stepped into the shape corresponding to the stepped surface 18 is prevented from interfering with the pouch 20 accommodating the stepped battery 10.

The concept that the separator surplus part 17 is stepped into the shape corresponding to the stepped surface 18 may be independent from whether the separator surplus part 17 is attached to the stepped surface 18. That is, when the separator surplus part 17 is stepped into the shape corresponding to the stepped surface 18, the separator surplus part 17 may be attached to the stepped surface 18 or may not be attached thereto.

In addition, the concept that the separator surplus part 17 is stepped into the shape corresponding to the stepped surface 18 may include the shapes illustrated in FIGS. 4 and 5.

The shape illustrated in FIG. 4 in which the separator surplus part 17 is completely attached to the whole of the stepped surface 18 to correspond thereto is obviously included in the concept that the separator surplus part 17 is stepped into the shape corresponding to the stepped surface 18. Furthermore, even when the separator surplus part 17 is formed at the steep angle as illustrated in FIG. 5, the tent portion of the separator surplus part 17 is significantly reduced to sufficiently achieve the above described effect. Thus, the separator surplus part 17 substantially has a shape corresponding to the stepped surface 18.

Even though a separator surplus part has a shape incompletely corresponding to the shape of a stepped surface, when the shape of the separator surplus part substantially corresponds to the shape of the stepped surface according to a degree of the effect, a limitation of a tool, or a limitation of a process, the shape of the separator surplus part may be included in the concept that a separator surplus part has a shape corresponding to a stepped surface.

Referring to FIGS. 4 and 5, portions of the separation film 16 pressed and attached to the stepped surface 18 by the press tool 30 are spaced apart from each other. Although portions of a separation film pressed and attached to the stepped surface 18 by the press tool 30 are generally attached to each other, the portions may be spaced a predetermined distance from each other as illustrated in FIG. 4 or 5. The case that the portions are spaced a predetermined distance from each other, and the case that the portions are attached to each other are within the scope of the present invention, provided that the tent portion of the separator surplus part 17 is pressed and thus does not interfere with the pouch 20.

Figure 6:
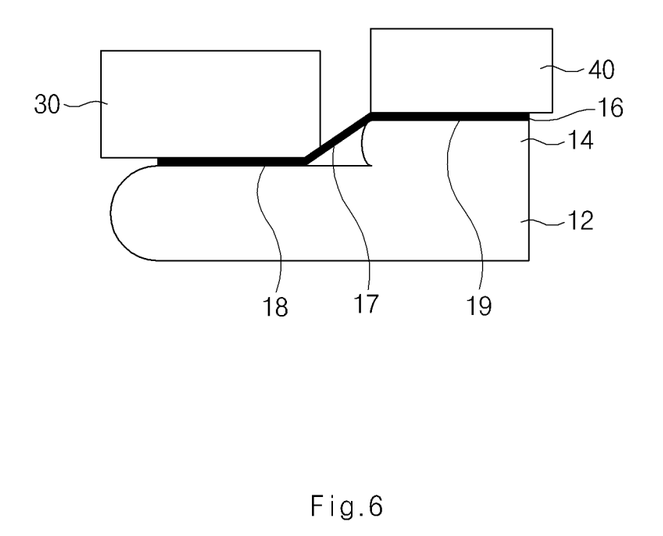
FIG. 6 is a side view illustrating an operation state of an upper jig and a press tool, which process a tent portion formed on a stepped surface of a stepped battery, in a stepped battery manufacturing method according to another embodiment of the present invention.

FIG. 6 is a side view illustrating an operation state of an upper jig and a press tool, which process a tent portion formed on a stepped surface of a stepped battery, in a stepped battery manufacturing method according to another embodiment of the present invention.

Referring to FIG. 6, a stepped battery manufacturing method according to the current embodiment may further include pressing an upper end surface 19 of the stepped battery 10 by an upper jig 40. The upper jig 40 may be installed over the lower jig (not shown) and may press the upper end surface 19 of the stepped battery 10. At this point, the separation film 16 pressed by the upper jig 40 may be attached to the upper end surface 19 of the stepped battery 10.

Specifically, the lower jig and the upper jig 40 are hot press jigs, and the stepped battery 10 may be promptly placed on the lower jig after a folding process, and then, undergo a hot press process for fixing the stepped battery 10. That is, after the folding process is completed, the stepped battery 10 may be promptly aligned with a predetermined location of the lower jig and be placed therein, without undergoing a separate hot press process (but, even when a separate hot press process is previously performed on the stepped battery 10, the stepped battery 10 may be processed according to the current embodiment). Then, the upper jig 40 and the press tool 30 installed over the stepped battery 10 placed in position may move downward to press the upper end surface 19 corresponding to the small cell 14 and perform an attaching and fixing operation on the stepped battery 10, and to press the tent shape part of the separation film 16 formed on the stepped surface 18 between the large cell 12 and the small cell 14 such that the tent shape part is attached and fixed onto the stepped surface 18 by heat.

As such, when the upper jig 40 and the press tool 30 are simultaneously operated, the upper jig 40 and the press tool 30 may be integrally formed to be integrally operated. In this configuration, the press tool 30 receives heat transferred from the upper jig 40 configured as a hot press jig, to heat and press the tent portion of the separation film 16, without employing a separate heating configuration (but, a separate heating part may be provided to the press tool 30).

Also in this configuration, the upper jig 40 may press the upper end surface 19 of the stepped battery 10, and simultaneously, the press tool 30 may press the stepped surface 18. Thus, the hot press process and a process of removing a tent shape from the separation film 16 may be simultaneously performed in a single process.

Alternatively, the upper jig 40 and the press tool 30 may be individually configured to be individually operated. Specifically in this configuration, the upper jig 40 may press the upper end surface 19 of the stepped battery 10, and then, the press tool 30 may press the stepped surface 18.

In this case, the press tool 30 presses the tent portion, so as to press the separation film 16, thereby more reliably preventing the small cell 14 from moving out of a proper location thereof. In addition, the hot press process and the process of removing the tent shape from the separation film 16 may be performed in a single process.

Each of configurations according to the present invention can be appropriately modified, provided that the function of the configuration is not sacrificed. In addition, each configuration is not limited to the embodiments set forth herein and is freely changed within the spirit and scope of the present invention as defined by the following claims.

The invention claimed is:

1. A stepped battery manufacturing method comprising:
   preparing a stepped battery having a tent portion of a separation film formed on at least one stepped surface;
   pressing the tent portion by using a press tool having a shape corresponding to the stepped surface of the stepped battery; and
   pressing an upper end surface of the stepped battery by an upper jig.

2. The stepped battery manufacturing method of claim 1, wherein the press tool comprises a hot press tool having a higher temperature than that of the tent portion and the stepped surface.

3. The stepped battery manufacturing method of claim 1, wherein the tent portion is attached to the stepped surface by pressing the tent portion in the pressing of the tent portion.

4. The stepped battery manufacturing method of claim 1, wherein the stepped battery is formed in a stack and folding manner.

5. The stepped battery manufacturing method of claim 1, wherein the stepped battery is formed by attaching separate electrodes to the separation film and folding the separation film.

6. The stepped battery manufacturing method of claim 1, wherein a contact area between the press tool and the stepped surface is equal to or greater than an area of a horizontal portion of a stepped surface of a pouch that packages the stepped battery.

7. The stepped battery manufacturing method of claim 1, wherein the press tool has a lower edge that contacts the separation film and that is provided with a chamfer.

8. The stepped battery manufacturing method of claim 1, wherein while the upper jig presses the upper end surface of the stepped battery, the press tool presses the stepped surface.

9. The stepped battery manufacturing method of claim 1, wherein after the upper jig presses the upper end surface of the stepped battery, the press tool presses the stepped surface.

* * * * *